United States Patent [19]

Saita

[11] Patent Number: 5,192,241

[45] Date of Patent: Mar. 9, 1993

[54] APPARATUS FOR DEBONING DARK MEAT OF FOWL

[75] Inventor: Tateji Saita, Isehara, Japan

[73] Assignees: Gordex Corporation, Japan; Geno Gasbarro, Columbus, Ohio

[21] Appl. No.: 887,834

[22] Filed: May 26, 1992

[30] Foreign Application Priority Data

May 29, 1991 [JP] Japan .................................. 3-124182

[51] Int. Cl.[5] ........................................... A22C 21/00
[52] U.S. Cl. .................................... 452/135; 452/125
[58] Field of Search ................ 452/135, 136, 125, 127

[56] References Cited

U.S. PATENT DOCUMENTS

| | | | |
|---|---|---|---|
| 2,851,362 | 9/1958 | Goldberg | 426/480 |
| 2,897,536 | 8/1959 | Bergstrom et al. | 452/139 |
| 3,089,775 | 5/1963 | Lindall | 452/140 |
| 3,300,317 | 1/1967 | Franklin | 452/135 |
| 3,570,050 | 3/1971 | Draper et al. | 452/149 |
| 4,020,528 | 5/1970 | Lindbladh et al. | 452/131 |
| 4,179,834 | 12/1979 | Thomas | 43/57.2 |
| 4,217,679 | 8/1980 | Gordon | 452/140 |
| 4,402,112 | 9/1983 | Gasbarro | 452/140 |
| 5,102,369 | 4/1992 | Martin et al. | 452/135 |

Primary Examiner—Willis Little
Attorney, Agent, or Firm—Mason, Fenwick & Lawrence

[57] ABSTRACT

To provide a deboning apparatus which can treat a "<"-shaped boned dark meat composed of upper leg dark meat portion and lower leg dark meat portion, so as to decompose the dark meat into meat and bone. The apparatus has a straightening device for straightening a "<"-shaped boned dark meat, a first conveyor device for conveying the straightened boned dark meat along a predetermined path; a plurality of bone spaced bone pressing members arranged along the path of convey by the first conveyor device; a scoring device disposed at an intermediate portion of the path of convey by said first conveyor device and having jetting nozzles for jetting pressurized water so as to score the dark meat along the bone, a separation device disposed adjacent to but spaced from the terminal end of the first conveyor device and capable of decomposing the boned dark meat into meat and bone by jets of pressurized water, a second conveyor device for conveying bone separated by the boned dark meat by the separation device, and a plurality of spaced second bone pressing members arranged along the path of convey by the second conveyor device.

4 Claims, 6 Drawing Sheets

5,192,241

APPARATUS FOR DEBONING DARK MEAT OF FOWL

BACKGROUND OF THE INVENTION

1. Field of the Invention

The present invention relates to a deboning apparatus for separating meat and bone of a fowl dark meat from each other.

2. Description of the Related Art

U.S. Pat. No. 4,402,112 discloses an apparatus for separating meat and bone of a fowl dark meat from each other. This apparatus has a ring-shaped nozzle having a plurality of jetting nozzle ports which are arranged on a circle so as to jet high-pressure water towards a point on the axis. In operation, a dark meat is inserted into the circle of the ring-shaped nozzle such that the bone extends in the direction of the axis, so that high-pressure water is jetted to the periphery of the bone of the boned dark meat, thereby separating the bone from the meat. This apparatus has a single pressing member of a triangular cross-section disposed above a conveyor device for conveying the boned dark meat to the ring-shaped nozzle and extending substantially over the entire length of the conveyor device. In operation, the pressing member cooperates with the conveyor device to clamp the boned dark meat therebetween so as to ensure that the boned dark meats moves into the circle of the ring-shaped nozzle at a predetermined positional relationship to the ring-shaped nozzle.

The apparatus disclosed in U.S. Pat. No. 4,402,112, however, suffers from the following problem. Namely, when a "<"-shaped boned dark meat composed of upper and lower leg portions, is to be processed, the upper and lower legs are twisted relative to each other when the boned dark meat is straightened in the space between the pressing member and the conveyor device. This makes it impossible to introduce the boned dark meat into the circle of the ring-shaped nozzle at a predetermined positional relationship to each other, or causes jamming of the above-mentioned space by the boned dark meat. Thus, the above-mentioned apparatus could not treat "<"-shaped boned dark meat.

SUMMARY OF THE INVENTION

Accordingly, an object of the present invention is to provide a deboning apparatus for separating meat and bone of a fowl dark meat, capable of treating a "<"-shaped boned dark meat composed of upper and lower leg portions.

In order to solve the above-described problem, the present invention provides a deboning apparatus for deboning dark meat of a fowl, comprising: a straightening device for straightening "<"-shaped boned dark meat, including a pair of driving rollers mounted for rotation about horizontal axes and disposed such that their roll surfaces oppose each other leaving a predetermined gap therebetween, at least the upper one of the driving rollers being provided with an annular groove formed in the roll surface thereof; a first conveyor device for conveying the boned dark meat straightened by the straightening device along a predetermined path, the first conveyor device being provided with means for gripping the bone in the dark meat and having a starting end adjacent to the straightening device and a terminal end remote from the straightening device; a plurality of first bone pressing devices arranged at a predetermined spacing along the path of convey by the first conveyor device; the first bone pressing device each including a scoring means for scoring the dark meat along the bone, the scoring means having a channel member having sa channel opposing the gripping means of the first conveyor device leaving a predetermined gap therebetween such that the channel extends in the direction of convey by the first conveyor means, the scoring means further having means for urging the leading end of the channel member as viewed in the direction of convey by the first conveyor means towards the gripping means of the first conveyor means; a scoring device for scoring the dark meat along the bone and disposed at an intermediate portion of the path of convey by the first conveyor means and having a jetting nozzle for jetting pressurized water; a separation device disposed adjacent to but spaced from the terminal end of the first conveyor device and adapted for jetting pressurized water to separate bone from the dark meat; the separation device having a ring-shaped nozzle having an axis extending in the direction of convey by the first conveyor means and means for reciprocately rotating the ring-shaped nozzle about its axis, the ring-shaped nozzle being provided with a plurality of jetting ports disposed along a circle on one side surface of the ring-shaped nozzle opposing the ring-shaped nozzle, the plurality of jetting nozzles being located and oriented towards a predetermined point on the axis; a second conveyor device having a starting end adjacent to the separation device and a terminal end remote from the separation device, the second conveyor device having gripping means for gripping the bone, thereby conveying the bone separated from the dark meat; and a plurality of spaced second bone pressing devices disposed along the path of convey by the second conveyor device; the second bone pressing device each including a channel member opposing the gripping means of the second conveyor device leaving a gap therebetween such that the channel extends in the direction of path of convey by the second conveyor device, and further including means for urging the leading end of the channel member as viewed in the direction of convey by the second conveyor device towards the gripping means of the second conveyor device.

In a preferred aspect of the present invention, the straightening device further includes a pair of second driving rollers arranged at one axial side of the pair of first driving rollers, the second rollers being rotatable about vertical axes, the second rollers having frustoconical lower ends the top faces of which are located at the same levels as the opposing surfaces of the pair of first rollers, and wherein the first and second conveyor devices including endless chains each having a plurality of mountain-like projections spaced in the direction of the run of the endless chain.

In another preferred aspect of the invention, the width of the channel of the channel member of the first conveyor device progressively decreases towards the downstream side as viewed in the direction of convey by the first conveyor device.

In still another preferred aspect of the invention, the scoring device includes a port formed in the rear face of the channel member of the first deboning apparatus, a nozzle support member fixed to the rear face of the channel member and having a bore communicating with the port formed in the rear face of the channel member, and a pressurized water jetting nozzle received in the bore in the nozzle support member.

According to the invention, the boned dark meat is made to pass through the straightening device with its bone clamped between the annular groove formed in the roll surface of the upper roller and the roll surface of the lower roller of the straightening device, with the hip joint positioned at the leading end thereof, whereby the "<"-shaped boned dark meat is straightened such that the upper and lower legs are on a straight line.

The straightened boned dark meat is then conveyed by the first conveyor device, with its bone gripped by the gripping device of the first conveyor device. During the conveyance, the bone portion of the boned dark meat is made to pass through the channels of a plurality of bone pressing devices which are arranged along the path of convey such that the channels extend in the direction of the convey. Therefore, even when the linearity of the upper and lower leg bones is impaired during the conveyance, the linearity is imparted each time the bone passes through the channel of each of plurality of bone pressing devices, whereby the linearity is maintained throughout the convey. There is no risk that the channel of each bone pressing device is clogged with the dark meat because each bone pressing device has a comparatively small length. In addition, since the leading end of the channel member of the bone pressing device as viewed in the direction of convey is urged towards the gripping means of the first conveyor device, a comparatively large force is exerted by the bone pressing device for pressing the bone of the dark meat towards the gripping means of the first conveyor device. Consequently, most part of the dark meat is compressed with a comparatively large force onto the gripping means of the first conveyor device with a comparatively short time interval. Consequently, relative twisting between the upper and lower legs is avoided during the conveyance.

High-pressure water jetted from the scoring device scores the meat along the straight upper and lower leg bones while the boned dark meat is conveyed by the first conveyor device. This facilitates subsequent separation of bone from the meat effected by the ring-shaped nozzle.

The boned dark meat, having the score formed along the upper and lower bones, is introduced from the terminal end of the first conveyor device into the circle of the ring-shaped nozzle while maintaining its linearity, with the hip joint positioned at the leading end. More specifically, the boned dark meat is forced into the circle of the ring-shaped nozzle by the gripping means of the first conveyor device gripping the bone, while being held in straight condition by the effect of the first bone pressing device. The bone which has passed through the ring-shaped nozzle is forcibly pulled out the ring-shaped nozzle by the gripping means of the second conveyor device, while keeping the straight condition by the effect of the second bone pressing device. Consequently, the bones are kept in completely straightened state when they pass through the ring-shaped nozzle. The boned dark meat passes through the ring-shaped nozzle such that the axis of the straightened bones coincides with the axis of the ring-shaped nozzle. During the passage of the dark meat, high-pressure water is jetted from the nozzle ports toward a point on the axis, so as to impinge upon the bone, thereby separating the meat from the bone. Since a plurality of nozzle ports are provided along the circle of the nozzle which is reciprocately rotated about the axis, and since the boned meat has been scored along the upper and lower leg bones, the separation of the meat from the bones is completely and easily effected over the entire length of the boned dark meat.

The dark meat separated from the bones is allowed to drop through the clearance between the first conveyor device and the ring-shaped nozzle, so as to be collected by a suitable meat collecting device.

In a specific aspect of the present invention, the straightening device further includes a pair of second driving rollers arranged at one axial side of the pair of first driving rollers, the second rollers being rotatable about vertical axes, the second rollers having frustoconical lower ends the top faces of which are located at the same levels as the opposing surfaces of the pair of first rollers, and wherein the first and second conveyor devices including endless chains each having a plurality of mountain-like projections spaced in the direction of the run of the endless chain In such a form of the invention, the boned dark meat which has passed through the straightening device is grasped by the mountain-like projections provided on the endless chain, so as to be conveyed along the path of convey of the first conveyor without fail. When the boned dark meat passes through the straightening device, the meat portions on both sides of the bone are pressed downward along the generating lines of the lower frusto-conical portions of the second pair of driving rollers. Consequently, the boned dark meat exhibits a generally "<"-shaped form with both meat portions suspending obliquely downward from the bone, when viewed from the downstream end of movement of the dark meat. Consequently, the boned dark meat substantially saddles on the endless chain, with the bone placed on the mountain-like projections, whereby the grasping of the boned dark meat by the mountain-like projections is conducted easily and securely.

In another specific aspect, the In another preferred form of the invention, the width of the channel of the channel member of the first conveyor device progressively decreases towards the downstream side as viewed in the direction of convey by the first conveyor device. With this arrangement, it is possible to securely and easily introduce the bone of the dark meat into the channels of the channel members.

In still another preferred aspect of the invention, the scoring device includes a port formed in the rear face of the channel member of the first deboning apparatus, a nozzle support member fixed to the rear face of the channel member and having a bore communicating with the port formed in the rear face of the channel member, and a pressurized water jetting nozzle received in the bore in the nozzle support member. In such a case, the overall size of the separation device can be decreased as compared with the case where the scoring device is disposed between the separation device and the adjacent first bone pressing device.

DESCRIPTION OF THE PREFERRED EMBODIMENT

An embodiment of the present invention will be described with reference to the drawings.

Figure 1:
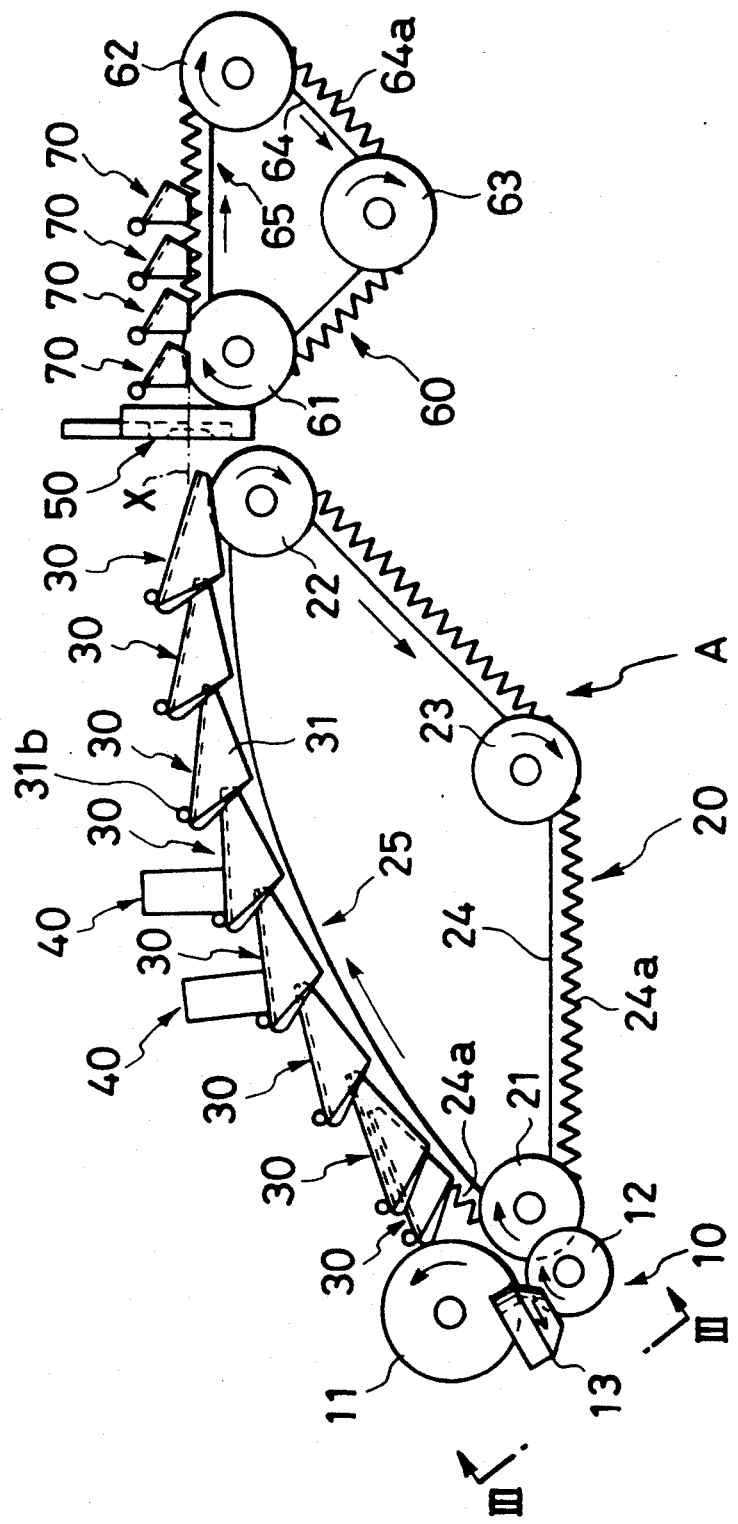
FIG. 1 is a side elevational view of the whole of a deboning apparatus embodying the present invention for decomposing a fowl dark meat into meat and bone.
Figure 2:
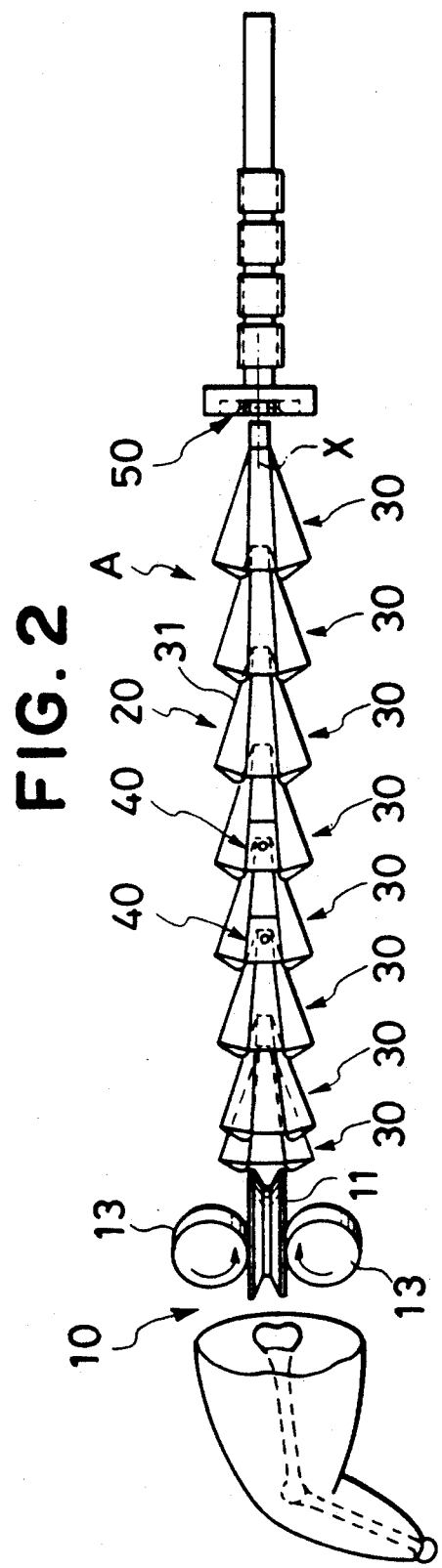
FIG. 2 is a top plan view showing general arrangement of the whole deboning apparatus embodying the invention for decomposing a fowl dark meat into meat and bone.
Figure 3:
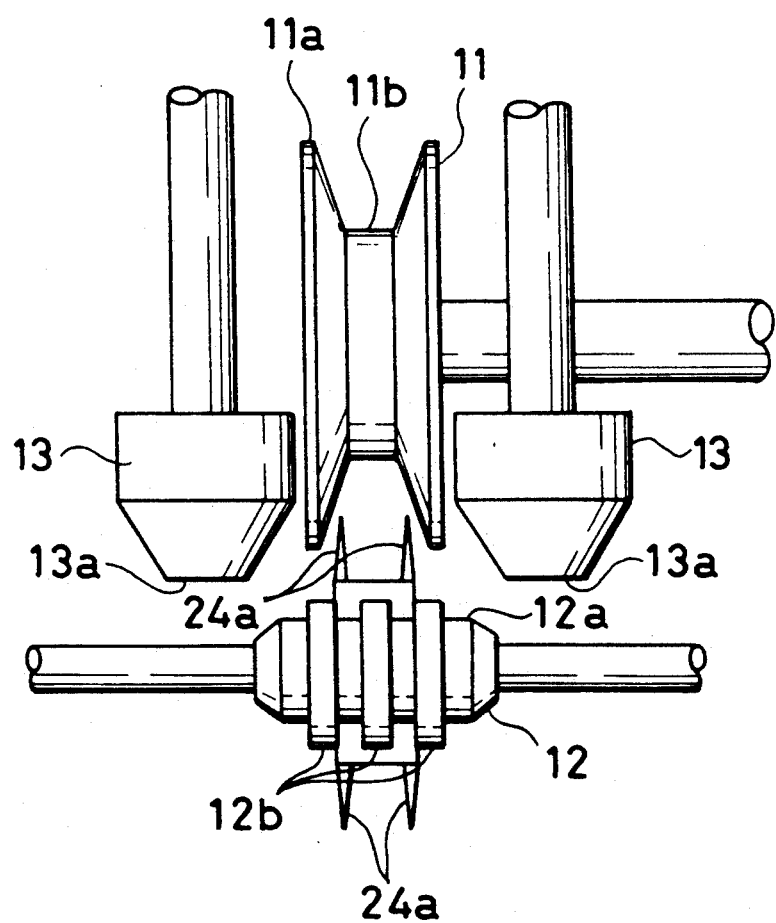
FIG. 3 is a view as viewed in the direction of arrow line III—III of FIG. 1.

Referring to FIGS. 1 to 3, there is shown a straightening device of a deboning apparatus A embodying the present invention for decomposing a fowl dark meat into bone and meat. The straightening device 10 has a first pair of driving rollers 11, 12 which are vertically spaced from each other such that their roll surfaces oppose each other and which are driven to rotate about axes of horizontally extending shaft members. The roll surface 11a of the upper driving roller 11 is provided with an annular recess 11b, while the roll surface 12a of the lower roller 12 has an annular ridge 12b. A second pair of driving rollers 13, 13 are disposed so as to be driven to rotate about axes of vertical shafts which extend in parallel with each other at both axial sides of the roller 11. Each roller has a frusto-conical lower end with a top surface 13a which is located at the same level as the gap between the opposing roll surfaces 11a and 12a of the rollers 11 and 12.

Referring to FIGS. 1 and 2, a first conveyor device 20 has a driving sprocket 21 which forms the starting end of this conveyor device 20 and which is disposed adjacent to the straightening device 10, a driven sprocket 21 disposed at the terminal end of the conveyor device 20 remote from the straightening device 10, a driven sprocket 23 disposed between these two sprockets and an endless chain which is stretched between the sprockets 21, 22 via the sprocket 23. The endless chain 24 is provided with a plurality of outwardly projecting mountain-like projections spaced in the direction of run of the chain 24.

Figure 4:
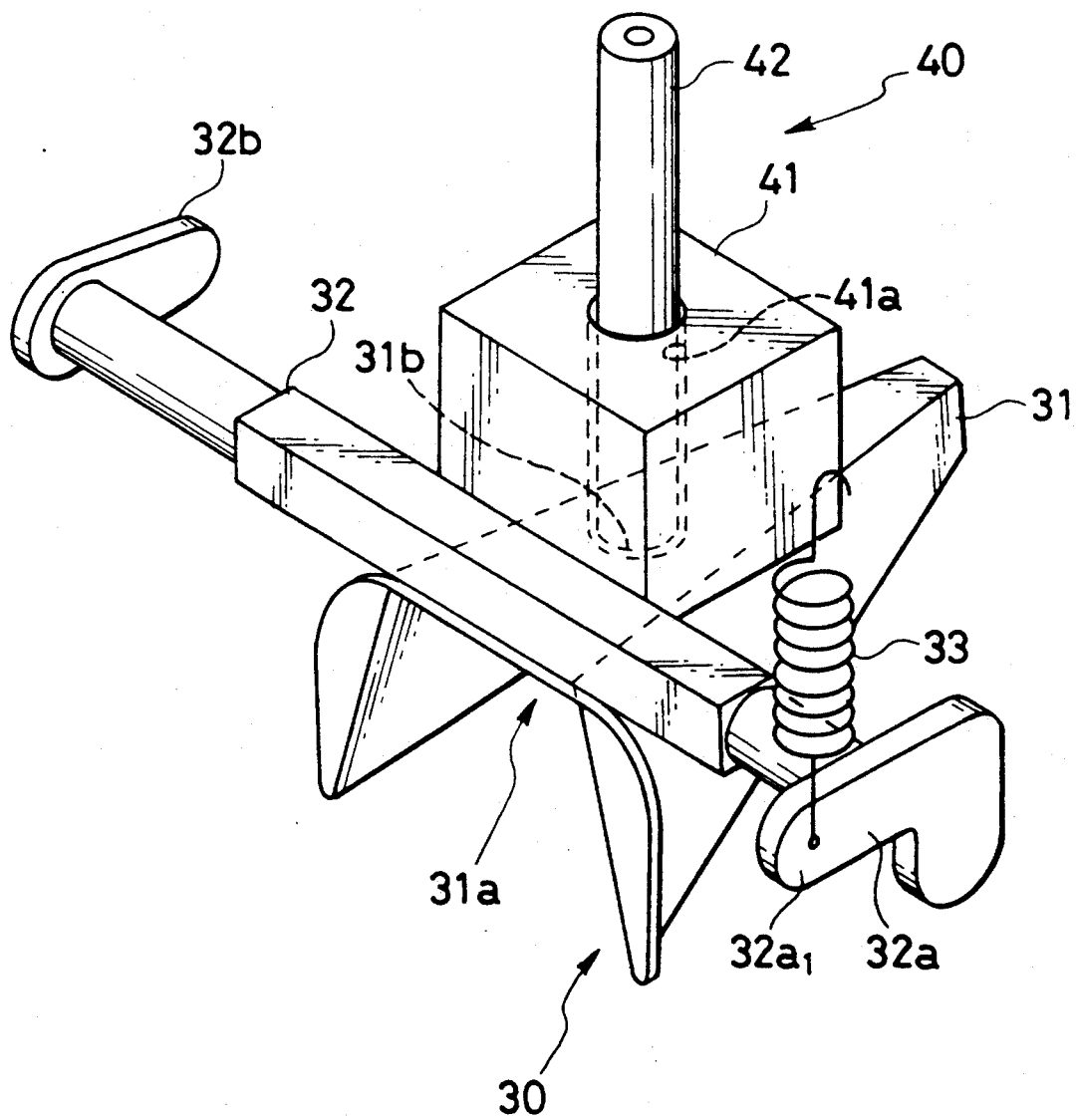
FIG. 4 is a perspective view of a first bone pressing device and a scoring device incorporated in the deboning apparatus embodying the invention for decomposing a fowl dark meat into meat and bone.
Figure 5:
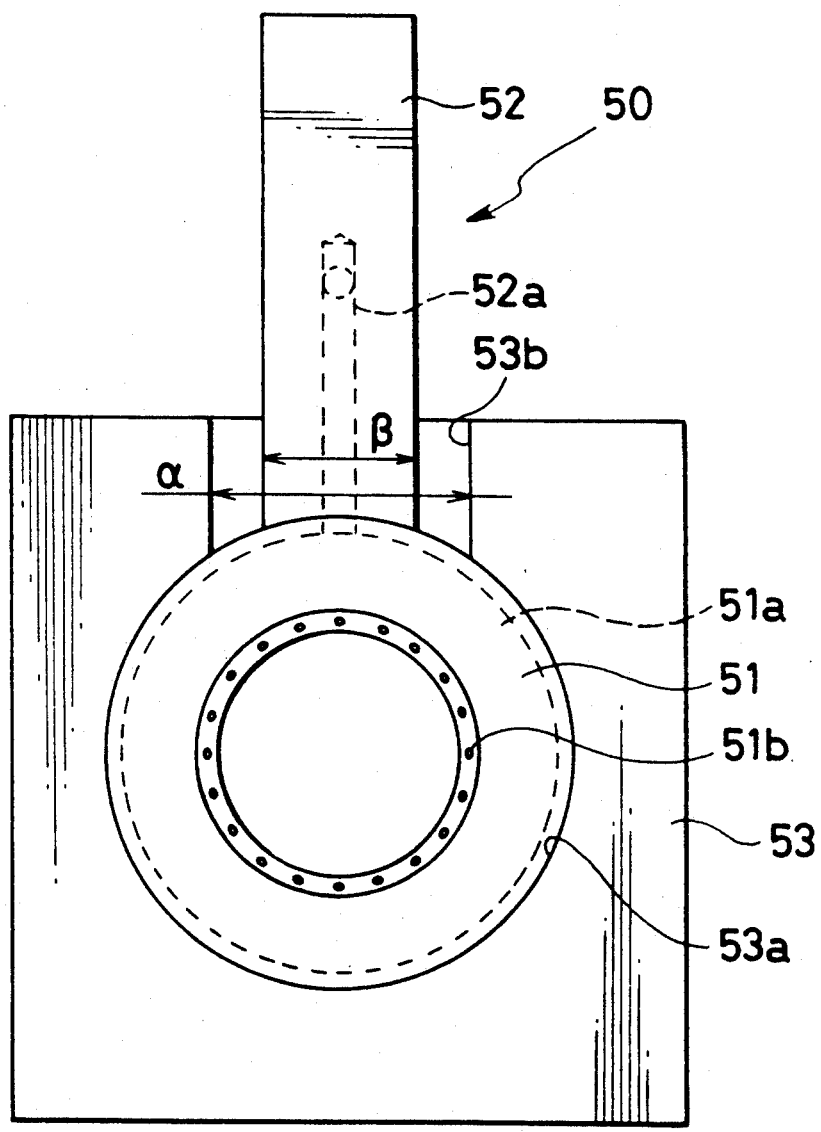
FIG. 5 is a front elevational view of a separation device incorporated in the deboning apparatus embodying the invention for decomposing a fowl dark meat into meat and bone.
Figure 6:
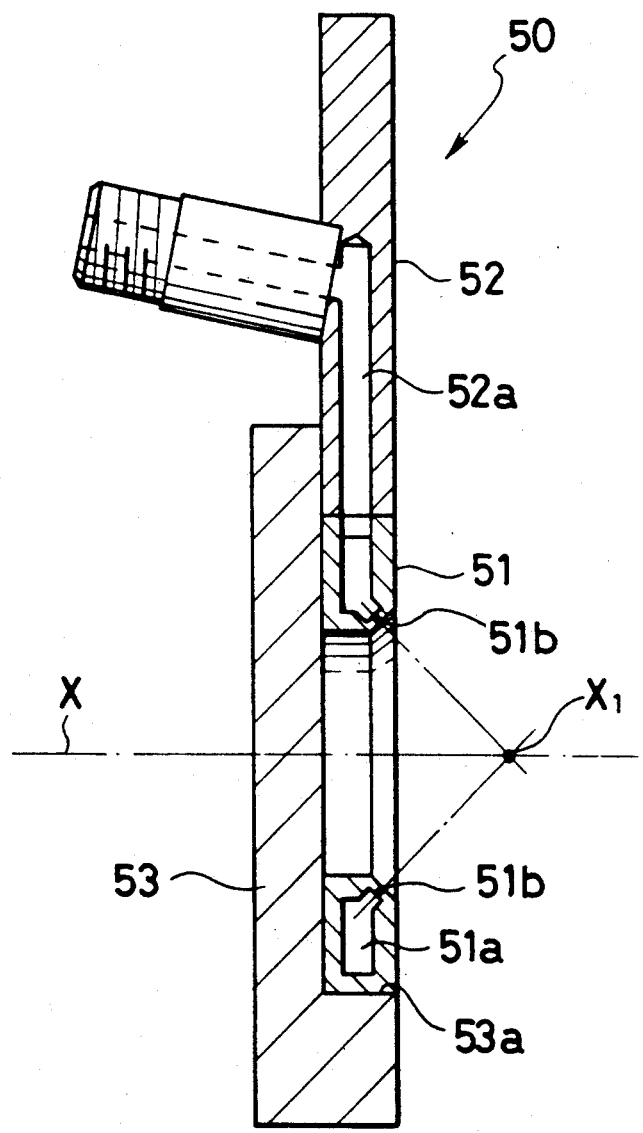
FIG. 6 is a sectional view of the separation device of FIG. 5 taken along a central plane.

A plurality of spaced first bone pressing devices 30 are disposed along and above the path 25 of convey by the first conveyor device 20 which extends between the driving sprocket 21 and the driven sprocket 22. As will be seen from FIGS. 1, 2 and 4, the first bone pressing device 30 has a channel member 31. The channel member 31 is disposed such that the groove 31a opposes the mountain-like projections 24a of the first conveyor device 20 leaving a gap therebetween and that the channel 31a extends in the direction of convey by the first conveyor device 20, i.e., the direction of path 25 of convey from the driving sprocket 21 to the driven sprocket 22. The width of the groove 31a is progressively decreased towards the downstream end as viewed in the direction of convey by the first conveyor device 20. A rod member 32 which extends orthogonally to the channel 31a is fixed to the rear face of the channel member 31, at the end of the channel member 31 where the channel 31a is widest, i.e., the end which is on the trailing side as viewed in the direction of convey by the conveyor device 20. The rod member 32 is supported at its both ends by supporting members which are not shown, such that it is rotatable only about its own longitudinal axis. An arm 32a provided on end of the rod member 32 extends towards the trailing end as viewed in the direction of convey by the conveyor device 20. The free end 32a₁ of the arm 32a is urged by a spring 33 upward, i.e., away from the mountain-like projections 24a of the conveyor device 20. As a result, the channel member 31 is rotated about the longitudinal axis of the rod member 32, so that the end of the channel member 31 where the channel is narrowest, i.e., the end on the leading side as viewed in the direction of convey by the conveyor device 20, is urged towards the mountain-like projections 24a. An arm 32b formed on the other end of the rod member 32 extends in the leading side as viewed in the direction of convey by the conveyor device 20. When the channel member 31 rotates about the longitudinal axis of the rod member 32, the arm 32b contacts a stopper which is not shown, thereby preventing the end of the channel member where the channel is narrowest from contacting the mountain-like projection 24a.

Each of two bone pressing devices 30 which are disposed midst of the path 25 of convey is provided with a scoring device 40 which scores the boned dark meat along the bone. The scoring device 40 is provided with a port 31b formed in the rear face of the channel member 31, a cubic nozzle supporting member 41 fixed to the rear face of the channel member 31 and having a bore 41a communicating with the port 31b formed in the rear face of the channel member 31, and a pressurized water jetting nozzle 42 received in the bore 41a of the nozzle supporting member 41.

A separation device 50 for decomposing the boned dark meat into bone and meat by a jet of pressurized water is disposed adjacent to but spaced from the driven sprocket 22 which provides the terminal end of the first conveyor device. The separation device 50 includes a ring-shaped nozzle 51 having an axis x extending in the direction of convey by the first conveyor device 20, and a substantially parallelopiped elongated portion 52 extending upward from the nozzle 51. The ring-shaped nozzle 51 is provided therein with an annular flow passage 51a, while the elongated portion 52 of the nozzle 51 is provided with a flow passage 52a which communicates with the annular passage 51a. The flow passage 52a is adapted to be supplied with high-pressure water supplied from a source of high-pressure water which is not shown. The ring-shaped nozzle 51 is provided with a plurality of nozzle ports 51b which hare arranged along a circle on the side surface of the ring-shaped nozzle 51 opposing the first conveyor device 20. The nozzle ports 51b are so located as to aim at a predetermined point $X_1$ on the axis X. The ring-shaped nozzle 51 and the lower portion of the elongated portion 52 are respectively received in a circular recess 53a formed in a supporting member 53 and a parallelopiped recess 53b of the same extending upward from the circular recess 53a. The inside diameter of the circular recess 53a is slightly greater than the outside diameter of the ring-shaped nozzle 51, while the width $\alpha$ of the parallelopiped recess 53b is much greater than the width $\beta$ of the elongated portion 52 of the nozzle 51. The ring-shaped nozzle 51, therefore, can rotate a predetermined angle within the circular recess 53a. The elongated portion 52 of the nozzle 51 is connected at its upper end to a link mechanism which is not shown, so that the ring-shaped nozzle 51 is reciprocately rotated about the axis X in the circular recess 53a by the operation of the link mechanism.

Referring to FIGS. 1 and 2, a second conveyor device 60 includes a driving sprocket 61 which provides the starting end of the second conveyor device 10 and which is disposed adjacent the separation device 50, a driven sprocket 62 which provides the terminal end of the second conveyor device 60 remote from the separation device 50, a driven sprocket 63 disposed intermediate between the sprockets 61, 62, and an endless chain 64 which runs around the sprockets 61 and 62 past the sprocket 63. The endless chain 64 is provided with a plurality of mountain-like projections 64a which are projected outward and spaced in the direction of run of the chain 64.

A plurality of spaced second bone pressing members 70 and disposed along and above the path 65 of convey of the second conveyor device 60. The second bone pressing member has a construction which is similar to that of the second bone pressing member 30. The channel width, however, is constant in the second bone pressing member 70.

A description will now be given of the operation of the deboning apparatus A of the present invention for decomposing a fowl dark meat into bone and meat. In the following description, an assumption is made that all rollers, sprockets and endless chains rotate and run in the directions indicated by arrows.

The boned dark meat is inserted into the nip between the upper and lower rollers 11, 12 of the straightening device 10 by manual labor, with the hip joint positioned on the leading end. When the dark meat passes through the straightening device 10 with the bone clamped between the recess 11b formed in the roll surface of the upper roller 11 and the annular ridge 12 on the lower roller 123, the upper and lower leg bones which have been connected in "<"-shaped through the knee joint are straightened such that they extend linearly.

The boned dark meat which has been straightened is then conveyed by the endless chain 24 serving as the first conveyor device 20 such that the bone is grasped by the mountain-like projections 24a on the endless chain 24. When the boned dark meat passes through the straightening device 10, the meat portions on both sides of the bone are pressed downward along the generating lines of the frusto-conical lower ends of the driving rollers 13. Consequently, the boned dark meat exhibits a "<"-like form with the meat portions suspending from the bone, when viewed from the downstream end. Consequently, the bond dark meat saddles on the endless chain with the bone placed on the mountain-like projection 24a, thus enabling the mountain-like projections 24a to grasp the boned dark meat easily and securely.

During the conveyance by the first conveyor device 20, the bone portion of the boned dark meat is made to pass through the channels 31a of a plurality of bone pressing devices 30 which are arranged along the path 25 of convey such that the channels extend in the direction of the convey. Therefore, even when the linearity of the upper and lower leg bones is impaired during the conveyance, the linearity is imparted each time the bone passes through the channel 31a of each of plurality of bone pressing devices, whereby the linearity is maintained throughout the convey. There is no risk that the channel 31a of each bone pressing device is clogged with the dark meat because each bone pressing device 30 has a comparatively small length. In addition, since the leading end of the channel member 31 of the bone pressing device as viewed in the direction of convey is urged towards the mountain-like projections 24a of the first conveyor device, a comparatively large force is exerted by the bone pressing device 30 for pressing the bone of the dark meat towards the mountain-like projections 24a of the first conveyor device. Consequently, the bone of the dark meat is compressed with a comparatively large force onto the mountain-like projections 24a of the first conveyor device with a comparatively short time interval. Consequently, relative twisting between the upper and lower legs is avoided during the conveyance. The bone of the dark meat can securely and easily introduced into the channel 31a of the channel member 31, by virtue of the fact that the width of the channel 31a of the channel member 31 progressively decreases towards the downstream end as viewed in the direction of convey of the first conveyor device 20.

High-pressure water jetted from the scoring device 40 scores the meat along the straight upper and lower leg bones while the boned dark meat is conveyed by the first conveyor device 20. This facilitates subsequent separation of bone from the meat effected by the ring-shaped nozzle. The scoring is effected twice. In this embodiment, the scoring device 40 is integrated with the bone pressing device 30, so that the overall dimensions of the whole separation device is reduced as compared with the case where the scoring device 40 is disposed between adjacent bone pressing devices 30.

The boned dark meat, having the score formed along the upper and lower bones, is introduced from the terminal end of the first conveyor device 20, i.e., the sprocket 22, into the circle of the ring-shaped nozzle 51 of the separation device 50, while maintaining its linearity, with the hip joint positioned at the leading end. More specifically, the boned dark meat is forced into the circle of the ring-shaped nozzle 51 by the mountain-like projections 24a of the endless chain 24 gripping the bone, while being held in straight condition by the effect of the first bone pressing device 30. The bone which has passed through the ring-shaped nozzle 51 is forcibly pulled out by the mountain-like projections 24a of the endless chain 64 serving as the second conveyor device 60, while keeping the straight condition by the effect of the second bone pressing device. Consequently, the bones are kept in completely straightened state when they pass through the ring-shaped nozzle 51. The boned dark meat passes through the ring-shaped nozzle 51 such that the axis of the straightened bones coincides with the axis X of the ring-shaped nozzle. During the passage of the dark meat, high-pressure water is jetted from the nozzle ports 51b toward a point $X_1$ on the axis X, so as to impinge upon the bone, thereby separating the meat from the bone. Since a plurality of nozzle ports 51b are provided along the circle of the nozzle 51 which is reciprocately rotated about the axis X, and since the boned meat has been scored along the upper and lower leg bones, the separation of the meat from the bones is completely and easily effected over the entire length of the boned dark meat.

The dark meat separated from the bone is allowed to drop through the clearance between the sprocket 22 of the first conveyor device 20 and the ring-shaped nozzle 51 so as to be collected by a suitable meat collecting device. Meanwhile, the bone separated from the meat is conveyed by the second conveyor device 60 so as to drop past the sprocket 62 of the second conveyor device 60 so as to be collected by a suitable bone collecting device.

As will be understood from the foregoing description, according to the present invention, the "<"-shaped boned dark meat, is straightened by the straightening device, and the straightened boned dark meat is conveyed while maintaining its linearity by the effect of the bone pressing devices. During the conveyance, the dark meat is scored by the scoring device along the straightened bone and is decomposed into meat and bone by the separation device which applies reciprocately rotating jets of high-pressure water to the region around the bone. Thus, the apparatus of the present invention makes it possible to efficiently decompose "<"-boned dark meat into meat and bone.

While the present invention has been explained by means of a preferred embodiment, one of ordinary skilled in the art will recognize that modifications and improvements may be made while remaining within the scope and spirit of the present invention. The scope of the present invention is determined solely by the appended claims.

What is claimed is:

1. A deboning apparatus for deboning dark meat of a fowl, comprising:
    a straightening device for straightening "<"-shaped boned dark meat, including a pair of driving rollers mounted for rotation about horizontal axes and disposed such that their roll surfaces oppose each other leaving a predetermined gap therebetween, at least the upper one of said driving rollers being provided with an annular groove formed in the roll surface thereof;
    a first conveyor device for conveying the boned dark meat straightened by said straightening device along a predetermined path, said first conveyor device being provided with means for gripping the bone in said dark meat and having a starting end adjacent to said straightening device and a terminal end remote from said straightening device;
    a plurality of first bone pressing devices arranged at a predetermined spacing along the path of convey by said first conveyor device;
    said first bone pressing device each including a scoring means for scoring said dark meat along the bone, said scoring means having a channel member having sa channel opposing said gripping means of said first conveyor device leaving a predetermined gap therebetween such that said channel extends in the direction of convey by said first conveyor means, said scoring means further having means for urging the leading end of said channel member as viewed in the direction of convey by said first conveyor means towards said gripping means of said first conveyor means;
    a scoring device for scoring said dark meat along the bone and disposed at an intermediate portion of the path of convey by said first conveyor means and having a jetting nozzle for jetting pressurized water;
    a separation device disposed adjacent to but spaced from said terminal end of said first conveyor device and adapted for jetting pressurized water to separate bone from said dark meat;
    said separation device having a ring-shaped nozzle having an axis extending in the direction of convey by said first conveyor means and means for reciprocately rotating said ring-shaped nozzle about its axis, said ring-shaped nozzle being provided with a plurality of jetting ports disposed along a circle on one side surface of said ring-shaped nozzle opposing said ring-shaped nozzle, said plurality of jetting nozzles being located and oriented towards a predetermined point on said axis;
    a second conveyor device having a starting end adjacent to said separation device and a terminal end remote from said separation device, said second conveyor device having gripping means for gripping the bone, thereby conveying the bone separated from said dark meat; and
    a plurality of spaced second bone pressing devices disposed along the path of convey by said second conveyor device;
    said second bone pressing device each including a channel member opposing said gripping means of said second conveyor device leaving a gap therebetween such that the channel extends in the direction of path of convey by said second conveyor device, and further including means for urging the leading end of said channel member as viewed in the direction of convey by said second conveyor device towards the gripping means of said second conveyor device.

2. A deboning apparatus according to claim 1, wherein said straightening device further includes a pair of second driving rollers arranged at one axial side of said pair of first driving rollers, said second rollers being rotatable about vertical axes, said second rollers having frusto-conical lower ends the top faces of which are located at the same levels as the opposing surfaces of said pair of first rollers, and wherein said first and second conveyor devices including endless chains each having a plurality of mountain-like projections spaced in the direction of the run of said endless chain.

3. A deboning apparatus according to claim 1, wherein the width of the channel of said channel member of said first conveyor device progressively decreases towards the downstream side as viewed in the direction of convey by said first conveyor device.

4. A deboning apparatus according to claim 1, wherein said scoring device includes a port formed in the rear face of said channel member of said first deboning apparatus, a nozzle support member fixed to the rear face of said channel member and having a bore communicating with said port formed in said rear face of said channel member, and a pressurized water jetting nozzle received in said bore in said nozzle support member.

* * * * *